US005121802A

United States Patent [19]

Rajala et al.

[11] Patent Number: 5,121,802

[45] Date of Patent: Jun. 16, 1992

[54] METHOD AND ARRANGEMENT FOR CONTROLLING A ROCK DRILLING APPARATUS

[75] Inventors: Rauno Rajala, Ylöjärvi; Pauli Rajakallio, Siivikkala, both of Finland

[73] Assignee: Oy Tampella, Tampere, Finland

[21] Appl. No.: 498,760

[22] Filed: Mar. 26, 1990

[30] Foreign Application Priority Data

Apr. 6, 1989 [FI] Finland .................................. 891655

[51] Int. Cl.[5] .......................... E21C 1/12; B23Q 5/00

[52] U.S. Cl. .......................................... 173/1; 173/7; 173/8; 173/11

[58] Field of Search ........................ 173/1, 8, 9, 4, 11, 173/7, 5, 12, DIG. 4; 175/296

[56] References Cited

U.S. PATENT DOCUMENTS

| | | | |
|---|---|---|---|
| 3,561,542 | 2/1971 | Hanson | 173/1 |
| 3,823,784 | 7/1974 | Feucht | 173/1 |
| 3,979,944 | 9/1976 | Salmi et al. | 173/8 |
| 4,064,950 | 12/1977 | Salmi et al. | 173/9 X |
| 4,074,771 | 2/1978 | Morrison | 173/11 X |

FOREIGN PATENT DOCUMENTS

| | | | |
|---|---|---|---|
| 55892 | 10/1979 | Finland | 173/8 |
| 1071462 | 6/1967 | United Kingdom . | |

*Primary Examiner*—Douglas D. Watts
*Assistant Examiner*—Clark F. Dexter
*Attorney, Agent, or Firm*—Nixon & Vanderhye

[57] ABSTRACT

The invention relates to a method and an arrangement for adjusting the percussion and the feed of a rock drilling apparatus with respect to each other. In the method, the volume flow of pressure fluid to be supplied to a percussion device (7) and a feed motor (8) is adjusted on the basis of the feed pressure of the feed motor (11), a volume flow adjusted pump (1) being controlled so that the ratio of the pressure applied to the persussion device (7) to the pressure of the feed motor (11) is set by control valves (10, 14). In the arrangement, pressure fluid is supplied to the percussion device (7) and the feed motor (11) by means of a volume flow adjusted pump (1). The arrangement further comprises control valves (10, 14) by means of which the volume flow of the pressure fluid fed by the pump (1) is kept such that the ratio of the pressure of the percussion device and that of the feed motor (11) remains substantially constant.

12 Claims, 1 Drawing Sheet

METHOD AND ARRANGEMENT FOR CONTROLLING A ROCK DRILLING APPARATUS

BACKGROUND OF THE INVENTION

The invention relates to a method of controlling the percussion power of a percussion device in a pressure fluid operated rock drilling apparatus, wherein pressure fluid is supplied simultaneously to the percussion device and through a pressure reduction means to a feed device and wherein the percussion power is controlled by adjusting the pressure of the pressure fluid supplied to the percussion device.

The invention is also concerned with an arrangement for controlling the percussion power of a percussion device in a pressure fluid operated rock drilling apparatus, comprising a pressure fluid pump, a percussion device and a feed device the supply line of which is connected to a pressure line for the pump, and at least one pressure reduction means connected between the pressure line of the pump and the feed device to reduce the pressure of the pressure fluid to be supplied to the feed device to a value lower than the pressure of the pressure line of the pump.

Percussion pressure in rock drilling apparatuses and their actuating means has been previously adjusted to a certain fixed value and the feed of the drifter has been adjusted by varying the pressure of the feed device in accordance with the kind of the rock to be drilled, which often causes problems.

If the feed pressure is too low with respect to the percussion pressure, the feed rate being lower than required or allowed, the percussion impulse will not be properly transmitted along the drill rod into the rock to be drilled, but causes vibration in the drill rod and the rest of the drilling equipment. The vibration is gradually converted into heat, the greatest temperature rise occurring in the threaded couplings of the drill rods or the like so that these parts in particular are exposed to extra strain. This may cause damage to the drilling equipment, or the drilling equipment may wear more rapidly than normal with resultant shorter service life and higher operating costs. At the same time the penetration rate of the drill into the rock is decreased and more time is required for drilling a hole of a determined length, which further increases the drilling cost. Vibration also subjects all the other mechanical and hydraulic components of the drilling equipment to an extra strain, increasing the need of maintenance and repair in the long run.

The object of the present invention is to provide a method and an arrangement for controlling the drilling process of a rock drilling apparatus, which avoids the above-mentioned difficulties and enables the drilling process to be carried out in the best possible way with regard to the conditions. The method of the invention is characterized in that the pressure fluid is supplied by means of a pressure-controlled volume flow pump, the volume flow of the pump being controlled by means of the pressure occurring between the feed device and the pressure reduction means and the ratio of the pressures of the pressure fluids to be supplied to the percussion device and the feed device, respectively, being adjusted to a substantially constant value by means of a pressure control means connected in series with the feed device.

The basic idea of the invention is that the ratio of the percussion pressure to the feed pressure is kept substantially constant by adjusting the percussion pressure in proportion to the feed pressure so that the power of the percussion impulse depends directly on the level of required feed pressure and bŷ using a pressure-controlled pump the volume flow of which is adjustable on the basis of the feed pressure. When the percussion power is proportional to the volume flow entering the percussion machinery, variation in the feed pressure causes similar variation in the percussion pressure, keeping the percussion pressure and, as a consequence, the percussion power proportional to the feed pressure.

The arrangement of the invention is characterized in that the pump is a pressure-controlled volume flow pump, the pressure fluid line going to the feed device being connected to a control pressure line for the pump between the pressure reduction means and the feed device, the pump comprising at least one pressure control means connected to the supply line of the feed device in series with it to keep the pressure of the pressure fluid to be supplied into the percussion device at a substantially constant ratio relative to the pressure occurring in the supply line of the feed device.

The basic idea of the arrangement of the invention is that the supply line of the feed motor is connected to the control pressure line of the pressure-controlled volume flow control pump, so that the volume flow of the pump is adjusted on the basis of the feed pressure of the feed motor. The supply line further comprises a pressure control means which keeps the ratio of the percussion pressure to the feed pressure substantially constant.

The invention will be described in greater detail in the following drawings, in which

DETAILED DESCRIPTION OF THE EXEMPLARY EMBODIMENT

Figure 1:
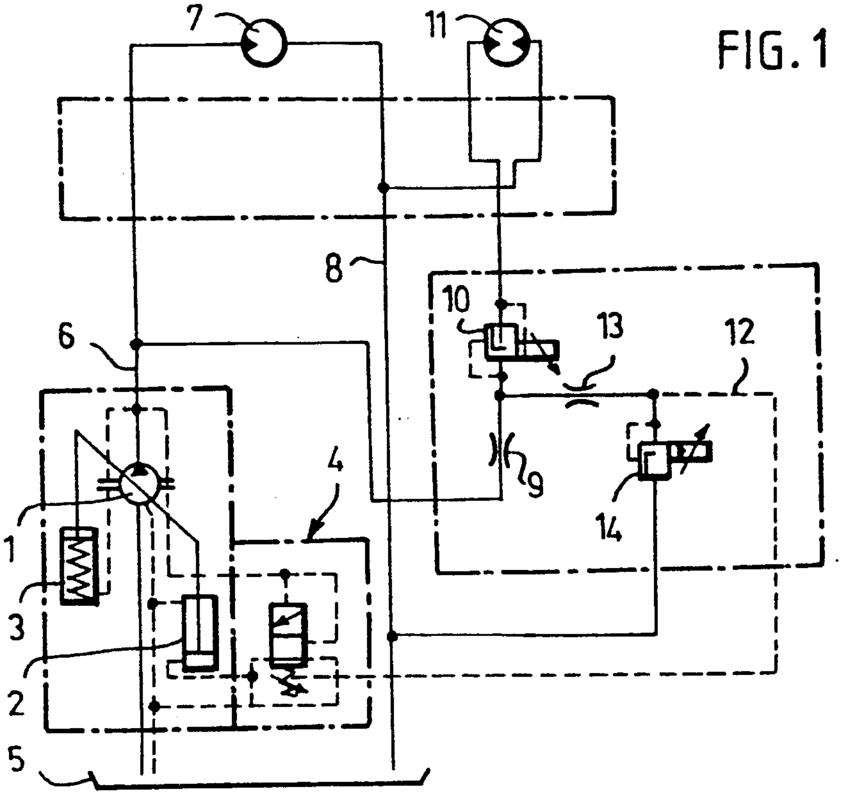
FIG. 1 shows a schematic connecting pattern of one embodiment of the invention.

FIG. 1 shows a volume flow control pump operated by a motor known per se (not shown). The pump comprises a flow control cylinder 2 and a spring-loaded counter cylinder 3. The pump is further provided with a pressure-controlled proportional control valve 4. The pump 1 is arranged to suck pressure fluid from a pressure fluid tank 5 and to further pass it into a pressure line 6. The pressure line 6 is connected to a percussion device 7 the operation and structure of which are generally known per se and will not be more closely described herein. Pressure fluid returning from the percussion device 7 is applied through a return line 8 back to the pressure fluid tank 5. The pressure line 6 of the pump 1 is further connected through a throttle 9 to a proportional valve 10 from which the pressure fluid is further passed to a feed device 11 which is generally a feed motor but may also be a feed device of some other kind, such as a pressure fluid cylinder. Pressure fluid from the feed motor 11 is again applied through the return line 8 to the pressure fluid tank 5. Pressure prevailing in the pressure fluid line is applied through a control line 12 connected between the throttle 9 and the proportional valve 10 and through a second throttle 13 to a proportional pressure relief valve 14 and further to the pressure-controlled proportional control valve 4. From the other side of the proportional pressure relief valve 14 the pressure fluid is passed through the return line 8 into the pressure fluid tank 5.

When the motor (not shown) rotates the pump 1 in a manner known per se, a pressure occurs in the pressure line of the pump, the flow of the pressure fluid causing the percussion device 7 to operate and the feed motor 11 to feed the drifter onwards in a manner known per se. Assuming that the conditions remain constant all the time, the pressure in the control line 12 also remains constant, and the operation of the pump 1 is not controlled from outside the system. Thereby the flow control cylinder 2 and the springloaded counter cylinder 3 normally contained in the pump 1 automatically keep the volume flow of the pump 1 such that the pressure in the pressure line 6 remains constant. The structure and operation of the pump and its associated components are widely known and will not be described more closely herein.

Still in constant conditions the pressure fluid flows from the pressure line 6 through the first throttle 9, which causes a pressure drop to occur in the throttle 9. The pressure fluid further flows through the proportional valve 10 to the feed motor 11, whereby a predetermined pressure loss independent of the flow occurs in the proportional valve 10 as a result of which the pressure prevailing in the feed motor 11 is smaller than the pressure prevailing in the pressure line 6 and the percussion device 7, the difference being equal to the combined pressure loss of the throttle 9 and the proportional valve 10. The pressure of the percussion device 7 is adjusted by means of the proportional pressure relief valve 14, which sets the maximum pressure for the line 12. By adjusting the pressure relief valve 14, the pressure in the line 12 can be varied with resultant increase or decrease in the volume flow of the pump 1 and, as a consequence, a drop of pressure in the pressure line 6 and in the percussion device 7. The control of the pressure relief valve 14 and that of the proportional valve 10 are interconnected so that an increase in the set value of the pressure relief valve, that is, an increase in the maximum value of the pressure of the control line 12 causes a decrease in the set value of the proportional valve 10, whereby the flow of pressure fluid across it causes a smaller pressure loss to occur and the pressure applied to the feed motor 11 is increased. The adjustment of the valves is such that the pressures of the feed motor 11 and the percussion device 7 are in linear relationship, that is, their ratio for a particular valve adjustment is substantially constant.

When the drill bit hits soft rock, a hole, cavity or the like during drilling, the force resisting the feed decreases, which causes a pressure drop to occur in the feed motor 11 and as a result between the proportional valve 10 and the throttle 9. Since the throttle 9 prevents a rapid flow of pressure fluid to the feed motor and thus an abrupt forward rush of the feed of the feed motor 11, the pressure drop causes the pressure of the control line 12 to drop correspondingly so that the position of the control valve 4 is adjusted with resultant rapid decrease in the volume flow of the pump 1. Pressure in the pressure line 6 decreases with decreasing volume flow so that the percussion pressure of the percussion device 7 decreases rapidly with decreasing feed pressure. In this way the percussion power will never be excessive in view of the feed, so that no heat formation will occur. When the drill bit then again hits normal rock or rock surface, the pressure on the supply side of the feed motor 11 increases again and pressure between the proportional valve 10 and the throttle 9 increases similarly until it reaches a pressure value to which the pressure relief valve 14 is adjusted. Correspondingly, pressure rise between the valve 10 and the throttle 9 causes a pressure rise in the control line 12, thus increasing the volume flow of the pump 1 by means of the control valve 4 up to a level required by the originally set percussion pressure.

Figure 2:
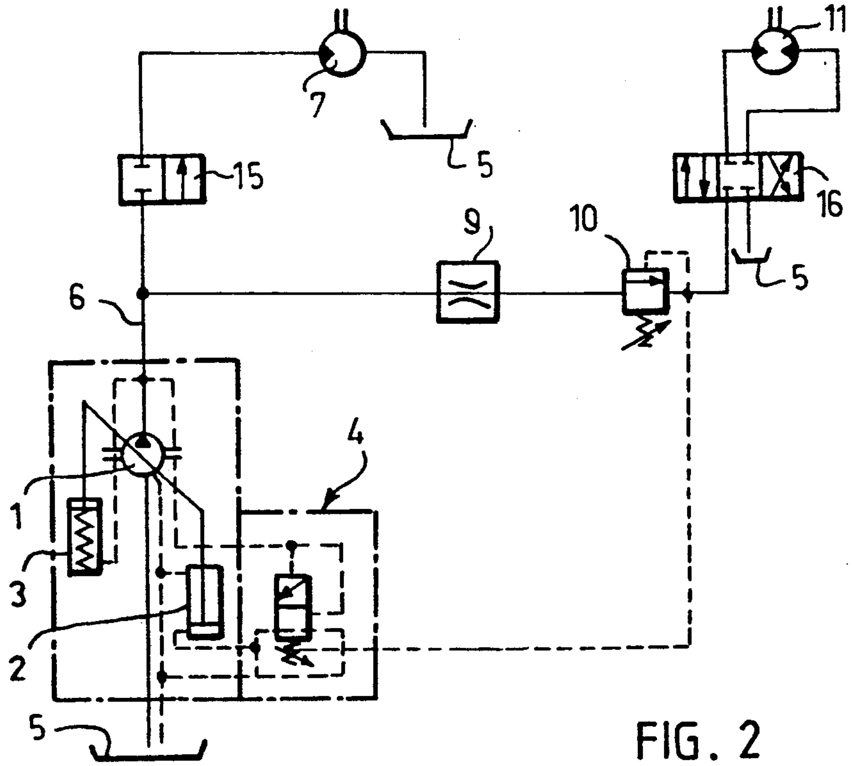
FIG. 2 shows a schematic connecting pattern of another embodiment of the invention.

FIG. 2 shows schematically another embodiment of the invention, in which the percussion pressure is not restricted to any predetermined upper limit, but the percussion and the feed interact with a predetermined pressure ratio so that a pressure rise in the feed motor causes a pressure rise in the percussion device. Correspondingly, a drop in the feed pressure causes a drop of pressure in the percussion device. The figure further shows a regulating valve 15 for switching on and off the percussion device, and a regulating valve 16 for connecting the feed motor to feed the drifter onwards or backwards or to stop it altogether. The operation and structure of these valves are known per se, and will not be described more closely herein. This embodiment utilizes only the proportional pressure-difference control valve 10' which is connected to maintain a pressure difference proportional to the feed pressure between the percussion pressure and the feed pressure. In this solution, when the regulating valves 15 and 16 are in the normal operating position, a change in the feed pressure causes a change in the volume flow of the pump 1 similarly as FIG. 1 so that the predetermined ratio of the pressure of the pressure line 6 of the pump and, accordingly, that of the percussion device 7, to the feed pressure of the feed motor is maintained. In the solution of FIG. 2, the ratio of the percussion pressure to the feed pressure can be adjusted by varying the set value of the proportional pressure-difference valve 10. Instead, when the maximum percussion pressure level applied is to be adjusted, this has to be carried out by adjusting the prestressing of the control valve 4 in the volume flow control of the pump.

A few embodiments of the invention have been described above by way of example and the invention is in no way restricted to them. The inventive idea can be applied by using volume flow pumps which can be adjusted in different ways and connecting patterns of different kinds to identify pressures and to connect control pressure to a pump with adjustable volume flow. Various widely used regulating and control valves and pressure relief valves or similar valves for controlling and protecting the operation of the apparatus have not been described nor shown in the figures, because they are not essential for the invention. The use of such control, adjustment and protection connections does not in any way restrict the invention nor limit its scope of protection. The invention, of course, has a variety of applications, such as the control of the drill boom or its components for proportioning their movements with each other.

What is claimed is:

1. A method of controlling the percussion power of a percussion device in a pressure fluid operated rock drilling apparatus, including a pressure reduction means and feed device, comprising the steps of:

(i) supplying a pressure fluid simultaneously to the percussion device and through the pressure reduction means to the feed device;

(ii) controlling the percussion power by adjusting the pressure of the pressure fluid supplied to the percussion device, characterized in that so that the pressure fluid is supplied by a pressure-controlled volume flow pump, the volume flow of the pump being controlled by the pressure occurring between the feed device and the pressure reduction means; and (iii) adjusting the ratio of the pressures of the pressure fluids to be supplied to the percussion device and the feed device, respectively, to a substantially constant value by a pressure control means connected in series with the feed device.

2. A method of controlling the percussion power of a percussion device according to claim 1 comprising the further step (iv) of maintaining the ratio of percussion pressure to feed pressure substantially constant by adjusting the percussion pressure correspondingly to the feed pressure, so that the level of percussion power is directly proportional to that of the feed pressure.

3. A method of controlling the percussion power of a percussion device according to claim 1 wherein the volume flow of step (ii) of the pressure fluid entering the percussion machinery is proportional to said percussion power.

4. An arrangement for controlling the percussion power of a percussion device in a pressure fluid operated rock drilling apparatus, comprising;

a pressure fluid pump, a percussion device and a feed device, supply lines of the percussion device and of the feed device connected to a pressure line from the pump, and at least one pressure reduction means connected between the pressure line of the pump and the feed device to reduce the pressure of the pressure fluid to be supplied to the feed device to a value lower than the pressure of the pressure line of the pump;

said pump comprising a pressure-controlled volume flow pump, a control pressure line from the pump connected to the supply line of the feed device between the pressure reduction means and the feed device; and at least one pressure control means connected to the supply line of the feed device in series with it to keep the pressure of the pressure fluid to be supplied into the percussion device at a substantially constant ratio relative to the pressure occurring in the supply line of the feed device.

5. An arrangement according to claim 4, wherein said pressure reduction means is a throttle.

6. An arrangement according to claim 4, wherein said pressure control means is an adjustable pressure-difference valve connected between the throttle and the feed device.

7. An arrangement according to claim 6, wherein said control pressure line of the pump is connected between the pressure-difference valve and the feed device.

8. An arrangement according to claim 6, wherein said control pressure line of the pump is connected between the pressure-difference valve, the arrangement further comprising an adjustable pressure relief valve connected to said control pressure line of the pump and limiting the pressure of said control line, and thus the pressure of the pressure fluid to be supplied to the percussion device, to a predetermined maximum value.

9. An arrangement according to claim 8, wherein said control means for the pressure-difference valve and the pressure relief valve are connected together to be controlled simultaneously so that when adjusting the maximum pressure of the pressure fluid to be supplied to the percussion device, the pressure-difference valve is correspondingly adjusted so that the ratio of the pressure of the pressure fluid to be supplied to the percussion device and that of the pressure fluid to be supplied to the feed device remains substantially constant for a particular adjustment.

10. An arrangement for controlling the percussion power of a percussion device according to claim 2 wherein said feed device is a pressure fluid cylinder.

11. An arrangement for controlling the percussion power of a percussion device according to claim 2 further comprising means for establishing a pressure differential between the feed device and the control line of the pump and the percussion device.

12. An arrangement for controlling the percussion power of a percussion device according to claim 11 wherein said means for establishing the pressure differential between the feed device and the control line of the pump and percussion device comprises means for establishing a pressure differential that is proportional to the pressure lost by the pressure control means.

* * * * *